United States Patent [19]
Ishida et al.

[11] 3,947,545
[45] Mar. 30, 1976

[54] PURIFICATION OF EXHAUST GAS
[75] Inventors: Yasuhiko Ishida; Nobuaki Wakita; Masato Yokota, all of Susono, Japan
[73] Assignee: Toyota Jidosha Kogyo Kabushiki Kaisha, Japan
[22] Filed: Oct. 2, 1973
[21] Appl. No.: 402,729

[30] Foreign Application Priority Data
June 20, 1973  Japan................................ 48-69507
June 20, 1973  Japan................................ 48-69508

[52] U.S. Cl. .......... 423/213.7; 23/288 F; 23/277 C; 60/299; 60/301; 423/210
[51] Int. Cl.$^2$ .................... F01N 3/14; B01D 53/00
[58] Field of Search............. 423/212, 213.2, 213.5, 423/213.7, 210; 55/DIG. 30; 60/282, 301, 303, 299; 23/288 F; 22/277 C

[56]  References Cited
UNITED STATES PATENTS

| | | | |
|---|---|---|---|
| 3,302,394 | 2/1967 | Pahnke et al. ............... | 423/213.2 X |
| 3,460,916 | 8/1969 | Aronsohn ...................... | 23/288 F |
| 3,505,028 | 4/1970 | Douthit ......................... | 423/212 X |
| 3,701,823 | 10/1972 | Hardison ...................... | 423/213.7 |
| 3,733,181 | 5/1973 | Tourtellotte et al. ........ | 423/213.7 X |
| 3,756,027 | 9/1973 | Gotoh et al. ................. | 60/282 X |
| 3,757,521 | 9/1973 | Tourtellotte et al. ........ | 423/213.7 X |
| 3,773,894 | 11/1973 | Bernstein et al. ............ | 423/213.5 |
| 3,807,173 | 4/1974 | Zmuda et al. ................ | 60/282 X |

Primary Examiner—G. O. Peters
Attorney, Agent, or Firm—Kenyon & Kenyon

[57] ABSTRACT

There are provided an improved thermal reactor apparatus for, and an improved method of, purifying exhaust gases, particularly from a motor vehicle, wherein thermal oxidation and catalytic oxidation of the CO and HC contents of the exhaust gases and/or catalytic reduction of the $NO_x$ contents of the exhaust gases are effected within an environment such that at least some of the components of the reactor exposed to the exhaust gases are coated with and/or made of a catalytic alloy capable of acting as a catalyst for oxidation of the CO and HC contents of the exhaust gases and for reduction of the $NO_x$ contents of the exhaust gases.

In the preferable embodiment of the invention, the above mentioned environment comprises an upper stream zone occupied by a rich reducing gas mixture, including the starting exhaust gases, and a lower stream zone occupied by a rich oxidizing gas mixture, including the resultant gases from the upper stream zone and additional air.

7 Claims, 21 Drawing Figures

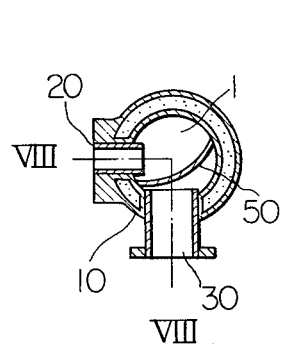
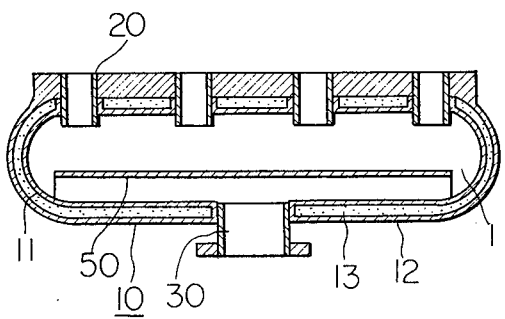
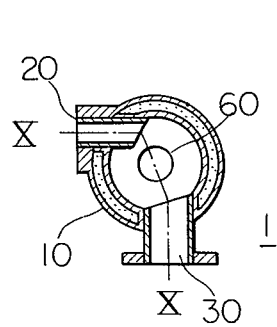
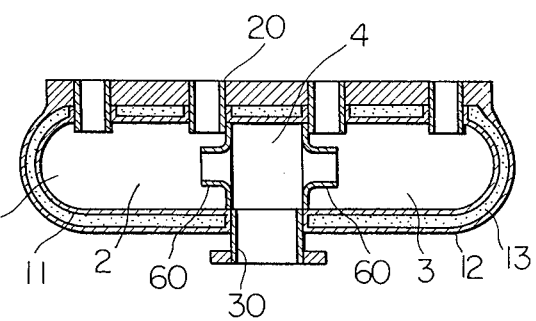
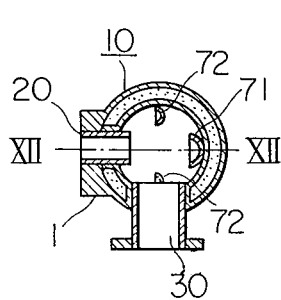
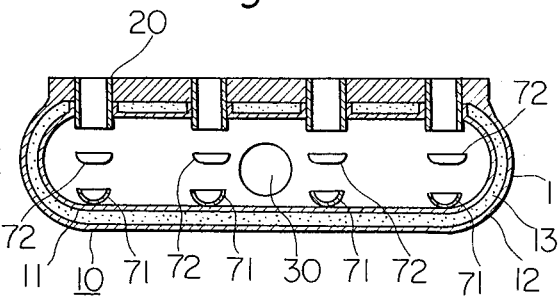

PURIFICATION OF EXHAUST GAS

The present invention relates to an apparatus for and a method of purifying exhaust gases from an internal combustion engine of a motor vehicle or the like. More particularly the present invention relates to an exhaust manifold reactor, or a thermal exhaust gas reactor, for effecting combustion of the unburned noxious contents, including unburned hydrocarbons referred to as HC, and carbon monoxide (CO) in hot exhaust gases to reduce air pollution.

The conventional thermal reactor comprises an outer shell of a heat insulated construction defining or forming an inner reaction chamber as an oxidation zone. An adjusted gas mixture of the exhaust gases, containing unburned components such as HC and CO with air added is introduced into the oxidation zone to carry out thermal oxidation of said unburned contents.

To carry out the thermal reaction effectively, the reaction zone must be large enough to ensure an adequately long contacting time or staying time of the reactant gases. Further, it is necessary to ensure that the temperature of the hot gases is in a range of from 800° to 900° C in the reaction zone. That is, the reactor must keep the mixture gases hot enough and make them stay long enough to oxidize them. However, even under such conditions, the temperature of the gas mixture near the surface of the inner wall of the reactor tends to decrease, so that the zone near the inner wall surface tends to become a no flame zone where little oxidation is effected. The presence of such a no flame zone is not preferable, because it leads to lower efficiency of a flame reaction all over the reaction zone. Particularly, owing to the no flame zone, a problem arises at the time of starting the operation of the engine from which the exhaust gases are fed to the thermal reactor. That is, at first when the engine is operated, the reaction chamber remains cold, so that the no flame zone occupies a large portion of the reaction zone and thus the temperature of the central zone for flame reaction surrounded by the no flame zone is relatively low. Therefore, the efficiency of the reduction of the CO and HC contents of the exhaust gases at the time of starting the engine is extremely low, so that it takes a long time for the reactor to warm up and the purification ability of the reactor during the time is very poor. To solve the above mentioned problem of the warming up period, there is a well known art. That is, the outer shell of the reactor is so designed that it is provided with an excellent insulating layer of materials, such as ceramic fibers between the inner and outer walls, and the inner parts of the reactor exposed to the reactant gases in the reaction chamber are so designed that they have smaller heat capacities than those of the conventional reactor. With a reactor constructed in this manner the gases in the central zone reach the desired high temperature as soon as possible.

To the same end, there is a well known catalytic convertor or muffler, wherein a no flame oxidation takes place. From the presence of the thermal reactor wherein flame oxidation takes place and the above catalytic convertor, a person skilled in the art might imagine a combination of the thermal reactor with the catalytic convertor. That is, a catalytic thermal reactor which contains in the reaction chamber the same catalyst particles or catalyst carriers as those in the catalytic convertor, of pellet, honey comb or wire-meshed form, thereby effecting the flame oxidation and simultaneously the no flame oxidation. In such a catalytic thermal reactor or manifold reactor, the filled catalysts would have to occupy most of reaction reaction zone where the thermal reation of HC and CO would be carried out in the case of the conventional thermal reactor or manifold reactor. This would lead to a considerably shorter contacting time or staying time of the reactant gases in such an imagined catalytic thermal reactor. However, because of the filled catalysts, the overall heat capacity of the reactor would be larger than in the case of the conventional reactor having no catalyst and this would result in the imagined catalytic thermal reactor having a considerably longer warming up period.

In the imagined catalytic thermal reactor, an additional purifying process would be effected by the catalytic oxidation of the CO and HC contents. However, the original thermal oxidation purification ability would be reduced owing to the decrease of the contacting time and the increase of the warming up period. Therefore, from the point of view of practical use, it is apparent that the imagined catalytic thermal reactor would be neither desirable nor useful. Particularly, considering that the long warming up period would lead to a reduction of the CO and HC purification ability at the time of starting the engine, the imagined catalytic thermal reactor would be disadvantageous.

However, in another aspect, it should be appreciated that the imagined catalytic thermal reactor could be expected to reduce the unburned CO and HC contents of the exhaust gases by thermal oxidation and additional catalytic oxidation and, further, to reduce the other noxious nitrogen oxide contents of the exhaust gases by catalytic reduction, in contrast to the conventional thermal reactor containing no catalyst, which reactor reduces only the unburned contents of HC and CO by thermal oxidation. In other words, if catalysts having reaction activities of oxidation and reduction were applied to the catalytic thermal reactor, a new advantage of reducing the other noxious contents of nitrogen oxides, including NO and $NO_2$ and so on, which are referred to as $NO_x$, could be obtained.

Such an advantage is not expected in the conventional thermal reactor.

It is an object of the present invention to provide an apparatus for effectively purifying the exhaust gases of a thermal reactor or manifold type reactor which has a high purification ability for CO and HC and also a high purification ability for $NO_x$ by applying catalysts capable of reducing CO, HC and $NO_x$ so as to neither increase the warming up period nor shorten the contacting time, particularly so as to positively shorten the warming up period.

Briefly stated, the above object of the present invention is achieved by an apparatus of the thermal reactor type for purifying exhaust gases containing CO, HC and $NO_x$ which comprises an outer shell of heat insulated construction forming an inner reaction chamber, at least one inlet conduit for introducing the exhaust gases with air added into the inner reaction chamber and an outlet conduit for discharging the resultant purified gases, wherein at least some of the components of the reactor exposed to the exhaust gas are coated with and/or made of alloy material having the two catalytic activities of oxidation and reduction, whereby catalytic oxidation of CO and HC and catalytic reduction of $NO_x$ are carried out at the catalytic surfaces of said portions while thermal oxidation of CO and HC occurs in the zone defined by the reaction chamber.

The above inventive apparatus is so applied that the inlet conduit is connected to the exhaust port of an internal combustion engine and to a conduit for feeding air to the exhaust gases in the same manner as in the conventional thermal reactor so as to introduce an adjusted gas mixture of the exhaust gases with air added into the reaction chamber. The resultant purified gases, in which the CO, HC and $NO_x$ contents are reduced are discharged from the reaction chamber through the outlet conduit.

In this connection, it should be noted that according to the inventive apparatus, reduction of the CO and HC contents by the oxidizing process and reduction of the $NO_x$ contents by the reducing process are carried out in a mixture in which air has been added to the exhaust gases. Therefore, if the gas mixture is a rich oxidizing gas mixture for example, if the air-fuel ratio is 16 to 17, a high reduction rate of the CO and HC contents is attainable. However, the reduction rate of the $NO_x$ contents is decreased under these conditions. If, on the other hand, the gas mixture is a reducing gas mixture, particularly if the air-fuel ratio is 14 to 15, the reduction rate of the $NO_x$ contents becomes high, while the reduction rate of the CO and HC contents becomes low. However, while it has been confirmed that in the former case, where a rich oxidizing gas mixture is involved, a substantial reduction of the $NO_x$ contents is not encountered, in the latter case, where the rich reducing gas mixture is involved, reduction of the CO and HC contents is attained to a fairly good extent. In this connection, three applications of the inventive apparatus as described above are adoptable as follows.

Firstly, the apparatus may be utilized for principally reducing the CO and HC contents of the exhaust gases by providing a rich oxidizing gas mixture which contains CO and HC. Secondly, the apparatus may be utilized for principally reducing the $NO_x$ contents of the exhaust gases by providing a rich reducing gas mixture which contains $NO_x$. Thirdly the apparatus may be utilized for reducing both the CO and HC contents and the $NO_x$ contents of the exhaust gases by providing a gas mixture under the conditions where the air-fuel ratio lies between that of the rich oxidizing gas mixture and that of the rich reducing gas mixture. According to the third application, it is inevitable that the reduction rates of the CO and HC contents and the $NO_x$ contents become low in comparison with the reduction rate of the CO and HC contents in the first application and the reduction rate of the $NO_x$ contents in the second application respectively.

The second object of the present invention is to provide a thermal reactor type apparatus, for purifying exhaust gases containing CO, HC and $NO_x$ in a relatively simple arrangement by improving the above mentioned catalytic thermal reactor directed to the first object of the present invention in such a manner that the introduced gas mixture is changed from a rich reducing gas mixture to a rich oxidizing gas mixture in the inner reaction chamber, whereby reduction of the CO and HC contents can be effected primarily in the rich oxidizing gas mixture and reduction of the $NO_x$ contents can be effected primarily in the rich reducing gas mixture.

It should be noted that in a case where both reduction of the CO and HC contents and reduction of the $NO_x$ contents are effected by catalysis, both reduction rates depend on the temperature of the catalyst which influences catalytic activity as well as on the nature of the reacting gas mixture. In the conventional catalytic convertor if a catalyst for oxidation is used, there is no difficulty encountered in introducing a gas mixture of exhaust gases and added air which is adjusted to an optimum gas mixture for oxidation of CO and HC. Generally the exhaust gases of an internal combustion engine have a high concentration of CO and HC in comparison with their concentration of $NO_x$. Therefore, in the conventional convertor it is not too difficult to keep the catalyst for oxidation at a high temperature which leads to high catalytic activity, because a great amount of heat energy is generated by the exothermic oxidizing reaction.

Also in the conventional catalytic convertor, if a catalyst for reduction is used, there is no difficulty encountered in introducing a gas mixture of exhaust gases and added air which is adjusted to an optimum gas mixture for reduction of $NO_x$. However, the $NO_x$ contents of the exhaust gases of an internal combustion engine are of relatively low concentration, as mentioned above, so that the amount of the thermal energy generated by the exothermic reaction of the $NO_x$ contents is extremely small in comparison with the case of oxidation of the CO and HC contents. Therefore, maintaining the catalyst for reduction of $NO_x$ at a temperature hot enough to obtain high reduction activity requires means for fairly complex arrangement to prevent the escape of the generated heat energy.

In consideration of the above, the third object of the present invention is to improve the inventive catalytic thermal reaction of the first object so that catalytic activity, particularly for reduction, is increased, by applying the heat energy generated by oxidation of the CO and HC contents both, to the reduction of the CO and HC contents and to the reduction of the $NO_x$ contents, which are of a relatively low concentration. This results in high reduction rates for both types of reduction due to the elevated temperature of the catalysts.

According to the present invention, the second and third objects of the invention in combination are achieved by an apparatus of thermal reactor type for purifying the exhaust gases containing CO, HC and $NO_x$, which comprises an outer shell of heat insulated construction forming an inner chamber as a reaction zone, at least one inlet conduit for introducing the exhaust gases with air added if necessary and an outlet conduit for discharging the resultant purified gases, wherein a component is provided to separate the reaction zone into an upper stream zone connecting fluidly to the inlet conduit and a lower stream zone connecting fluidly to the outlet conduit, in an arrangement such that said upper stream zone communicates fluidly with said lower stream zone. An injection nozzle is provided for feeding air into the gasses passing from said upper stream zone to said lower stream zone, and at least some of the components of the reactor exposed to the gases, are coated with and/or made of an alloy material having the two catalytic activities of oxidation and reduction, whereby catalytic reduction is effected primarily in said upper stream zone by providing there a rich reducing gas mixture involving exhaust gases only or exhaust gases and additional air from the inlet conduit and then the catalytic oxidation and thermal oxidation are effected primarily in said lower stream zone by providing there a rich oxidizing gas mixture involving the resultant gases from said upper stream zone and air from the nozzle.

With respect to the above mentioned component for separating the reaction zone, various forms are adoptable. However, the most preferable component is a cylinder having inner and outer circular surfaces, because such cylindrical form provides two large surfaces which respectively face the two separated zones in the limited reaction zone.

The various features of the present invention will become apparent from the following detailed description set forth in connection with the accompanying drawings which relate to the preferred embodiments of the invention and are given by way of illustration. In the drawings:

FIGS. 7 and 8 are respectively, a cross-sectional view and a longitudinally sectional view taken along the line VIII—VIII in FIG. 7, showing a fourth embodiment of the reactor of the first type according to the invention;

FIGS. 9 and 10 are respectively, a cross-sectional view and a longitudinally sectional view taken along the line X—X in FIG. 9, showing a fifth embodiment of the reactor of the first type according to the invention;

FIGS. 11 and 12 are respectively, a cross-sectional view and a longitudinally sectional view taken along the line XII—XII in FIG. 11, showing a sixth embodiment of the reactor of the first type according to the invention;

Figure 1:
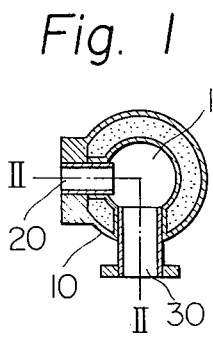
FIGS. 1 and 2 are respectively, a cross-sectional view and a longitudinally sectional view taken along the line II—II in FIG. 1, showing a first embodiment of the reactor of a first type according to the invention.
Figure 2:
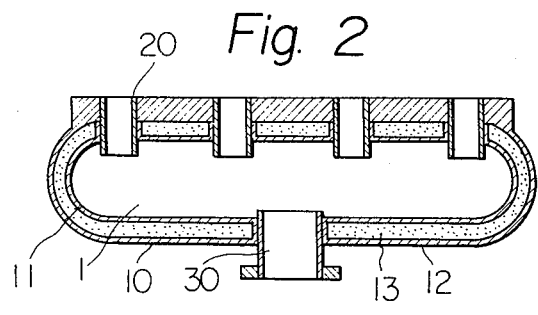

With reference to FIGS. 1 and 2, a reactor of the first type is a relatively simple structure designed as an apparatus for purifying the exhaust gases from a four cylinder engine. An inner chamber 1 is the reaction zone and is formed by an outer shell 10 which comprises an inner shell wall 11, an outer shell wall 12 and a heat insulated layer 13 sandwiched therebetween. The heat insulated layer may be made of such material as ceramics. Inlet conduits 20 for introducing the exhaust gases and an outlet conduit 30 for discharging the purified gases are disposed in the outer shell 10. The inlet conduits 20 are so disposed that the direction of introduction of the gas fluids into the chamber 1, through the conduits is perpendicular to the longitudinal axis of the chamber or the outer shell. In other words, the axis of each inlet conduit is at a right angle to the longitudinal axis of the outer shell. The axis of the outlet conduit 30 is perpendicular to the axes of the inlet conduits 20. In practical use of the reactor the inlet conduits 20 communicate the corresponding exhaust ports of the cylinder head in the engine with the chamber 1, and also are connected to conduits for adding air, which is referred to as secondary air in relation to the first air fed to the engine.

According to the present invention, the surfaces of the inlet conduits 20 and the inner shell wall 11 are coated with a catalytic alloy. Alternatively the inlet conduits 20 and the inner shell wall 11 themselves are made of such a catalytic alloy. In the case of the catalytic coating, the components to be coated must be made of a heat resistant material adaptable to high temperature use in an oxidizing atmosphere or reducing atmosphere. The outer shell wall 12 may be made of common material such as cast iron or ordinary steel.

With respect to the catalytic alloy, a preferable alloy which comprises, for example, Fe Ni and Cu and which in capable of acting as a catalyst for oxidation and reduction may be used. However, the catalytic alloy is not limited to the above, and various kinds of alloys capable of acting as a catalyst for oxidation of the CO and HC contents of exhaust gases and reduction of the $NO_x$ contents of exhaust gases may be utilized.

FIGS. 1 and 2 show the simplest construction of the reactor of the present invention, since there is no component occupying the space of the inner chamber 1.

Figure 3:
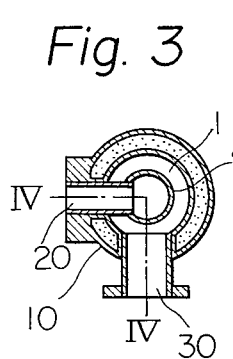
FIGS. 3 and 4 are respectively, a cross-sectional view and a longitudinally sectional view taken along the line IV—IV in FIG. 3, showing a second embodiment of the reactor of the first type according to the invention.
Figure 4:
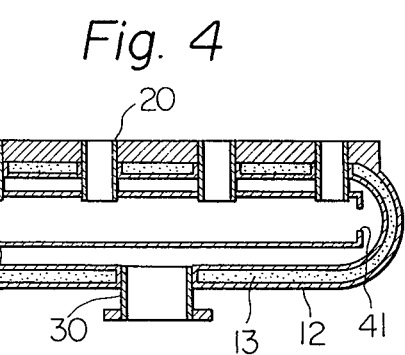

Referring to FIGS. 3 and 4, which show a modification of the reactor in FIGS. 1 and 2 as a second embodiment of the first type reactor, the reactor has an inner core 40 mounted within the inner chamber 1. In this second embodiment, the additional inner core 40 is a cylinder having openings at both ends along the longitudinal axis. The inlet conduits 20 are connected to the inner core 40 through the cylindrical wall thereof. The inner and outer cylindrical surface of the inner core 40 are coated with the same catalytic alloy as in the first embodiment. Alternatively, the inner core may be made of the catalytic alloy. The other components of the reactor are constructed substantially the same as in the first embodiment.

Figure 5:
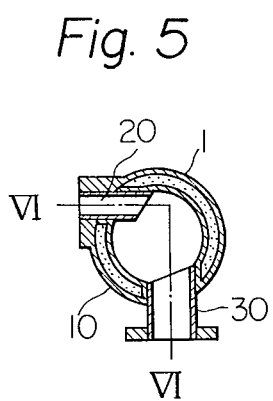
FIGS. 5 and 6 are, respectively, a cross-sectional view and a longitudinally sectional view taken along the line VI—VI in FIG. 5, showing a third embodiment of the reactor of the first type according to the invention.
Figure 6:
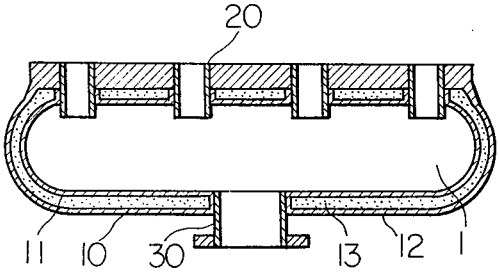

A third embodiment of the first type reactor is shown in FIGS. 5 and 6. The reactor of this embodiment is constructed the same as the first embodiment except for the following. The inlet conduits 20 are disposed in the outer shell 10 in a manner such that the exhaust gases from the engine are introduced into the inner chamber 1 through the conduits in a tangential direction to the circular inner surface of the chamber. The result of this is that the gases from the conduits circulate along the inner circular surface of the chamber.

A fourth embodiment of the first type reactor is shown in FIGS. 7 and 8. The reactor of this embodiment is a modification of the reactor of the first embodiment in that a plate form separator for gases 50 is mounted within the inner chamber 1. The separater 50 is coated with or is made of the same catalytic alloy as mentioned in the first embodiment.

A fifth embodiment of the first type reactor is shown in FIGS. 9 and 10. The reactor of this embodiment is a modification of the reactor of the third embodiment in that a pair of constricting plates 60 are mounted within the inner chamber 1. Each constricting plate 60 comprises a disk having a central hole and is positioned perpendicular to the longitudinal axis of the inner chamber 1. An additional pipe is fitted in each central hole and protrudes toward the respective end of the inner chamber closest to the constricting plate 60 in which the pipe is mounted. The pair of constricting plates 60 are located at opposite edges of the opening of the outlet conduit 30 and thereby the inner chamber is divided into three local chambers 2, 3 and 4. The gases are firstly introduced through the inlet conduit 20 into the chambers 2 and 3, then pass into the central chamber 4 through the pipes in the pair of constricting plates 60 and, finally, and discharged from the central chamber 4 through the outlet conduit 30 which communicates with the central chamber 4. Each constricting plate 60 is coated with or made of the same catalytic alloy as in the previously mentioned embodiments. The other components of the reactor are constructed substantially the same as in the third embodiment.

A sixth embodiment of the first type is shown in FIGS. 11 and 12. The reactor of this embodiment is a modification of the reactor of the first embodiment in that a plurality of receptive plates 61 and 72 for gases are mounted in the chamber 1. Receptive plates 71 and 72 are located in each of the planes wherein the axis of an inlet conduit lies, and are mounted on the inner shell wall 11. Each receptive plate is coated with or made of the same catalytic alloy as in the previous mentioned embodiments. The other components are constructed substantially the same as in the first embodiment.

The exemplified reactors of the first type are characterized in that the inlet conduits 20, the inner shell wall 11 and the other members mounted within the inner chamber 1 are coated with a catalytic alloy on their surfaces exposed to the exhaust gases or they are made of the catalytic alloy. According to the invention, the other components exposed to the gases, for example the outlet conduit 30, may be made of the catalytic alloy or the surface exposed to the gases may be coated with the catalytic alloy.

According to the inventive reactor of the first type, chemical reactions for purifying the exhaust gases are effected as follows.

In any of the above exemplified reactors, when a gas mixture of exhaust gases with air added, which is referred to as the secondary air in relation to the first air in the engine is introduced into the inner chamber 1 through inlet conduits 20, the same thermal reaction as in the conventional thermal reactor occurs to oxidize the CO and HC contents in the exhaust gases. Simultaneously, additional catalytic oxidation of the CO and HC contents is effected by the catalytic alloy of the inner shell wall 11. Such catalytic oxidation can be also effected at the catalytic alloy surfaces of the inner components exposed to the gases, for example the inner surface of the inlet conduit 20 or the outlet conduit 30, or the opposite side surfaces of the inner core 40, the separaters 50, the constricting plates 60 or the receptive plates 71 and 72.

The first feature of the present invention resides in the fact that the catalytic surfaces are the surfaces of the reactor components exposed to the gases, so that the reactor provides enough reaction space in the inner chamber to prevent it from decreasing the contacting time of the gases and the heat capacity of the reactor is only slightly or not at all increased in comparison with the conventional thermal reactor. Therefore, the inventive reactor ensures a purifying capability very similar to or the same as in the conventional thermal reactor.

The second feature of the invention resides in the fact that additional catalytic oxidation is effected at the surfaces exposed to the gases which results in the following advantages. In addition to the ability to reduce the contents of the CO and HC in the exhaust gases by thermal reaction, which is similar to that in the conventional thermal reactor, the ability to reduce the contents of the CO and HC in the exhaust gases by catalysis is created. Therefore, the total ability to reduce the contents of the CO and HC in the exhaust gases is greater than with the conventional thermal reactor. Further, since the surfaces exposed to the gases are heated owing to the catalytic reaction, the warming up period is advantageously shorten in comparison with the conventional thermal reactor. In other words, the no flame zone in the inner chamber become distinctively smaller.

The third feature of the invention resides in the fact that, in addition to the reduction of the CO and HC contents of the exhaust gases by the thermal oxidation and the catalytic oxidation, reduction of the $NO_x$ contents can be achieved by the catalyst at the surfaces of the components exposed to the gases.

The fourth feature of the invention resides in the fact that the activities of the catalyst leading to the oxidizing reaction and the reducing reaction are improved by the hot gas mixture for thermal oxidation. The reaction rates of the oxidizing reaction and the reducing reaction are changed according to the various conditions of the gas mixture. Although the optimum condition varies in a strict view, according to the composition of the gasoline used in the internal combustion engine, the reduction rate for the $NO_x$ contents is maximum under the desired condition of a rich reducing gas mixture, that is of an adjusted exhaust gas mixture corresponding to exhaust gases which would result from starting gases in the engine having an air-fuel ratio of from 14 to 15. Even if the inner chamber of the reactor is occupied with such a reducing gas mixture, an oxidizing reaction may be effected to reduce the CO and HC contents in the gas mixture. Similarly, although the optimum condition varies, in a strict view, according to the composition of the gasoline used in the engine, the reduction rate for CO and HC contents is maximum under the desired condition of a rich oxidizing gas mixture, that is of an adjusted exhaust gas mixture corresponding to exhaust gases which would result from starting gases in the engine having an air-fuel ratio of from 16 to 17. Under such oxidizing gas mixture, little reduction of the $NO_x$ contents occurs. In this connection, it is preferable to use the reactor of the first type as an apparatus for purifying the exhaust gases with a primary purpose of decreasing the CO and HC contents by providing such oxidizing gas mixture as mentioned above, or alternatively, with a primary purpose of decreasing the $NO_x$ contents by providing such reducing gas mixture as mentioned above.

Considering the different arrangements between the above described embodiments and the effects resulting therefrom, the reactor of the second embodiment has an advantage of improving the catalytic effect within the inner chamber in comparison with the reactor of the first embodiment, because in the second embodiment the arrangement is such that the catalytic surface which can contact the gases introduced into the inner chamber is larger than in the reactor of the first embodiment.

With respect to the third embodiment, an arrangement is adopted such that the introduced gases are forced to flow so as to contact the inner shell wall. Therefore, although the structure of the reactor is as simple as that of the reactor of the first embodiment, an improvement of increasing the catalytic effect is obtained.

With respect to the fourth and sixth embodiments, the respective reactors have the catalytic components 50 and 71 and 72, which enlarge the catalytic zone which the introduced gases contact, so that an improvement of the catalytic effect is obtained in comparison with the first embodiment.

The reactor of the fifth embodiment is a modification of the reactor of the first embodiment wherein the components 60 are added to prolong the contacting time or staying time of the introduced gases by forcing them to circulate within the inner chamber and to enlarge the catalytic surface. Therefore, a higher catalytic effect than in the third embodiment is obtained in the fifth embodiment.

Figure 13:
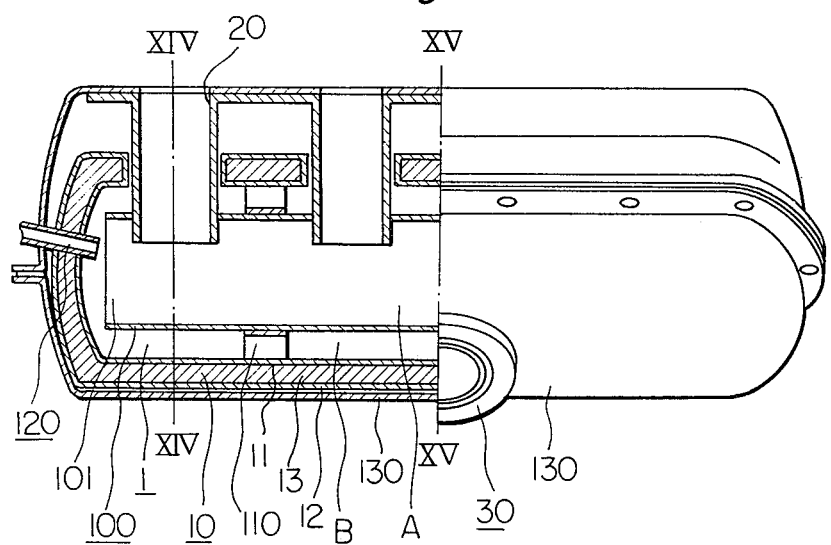
FIG. 13 is a partially sectional side elevation view showing an embodiment of the reactor of a second type according to the invention.
Figure 14:
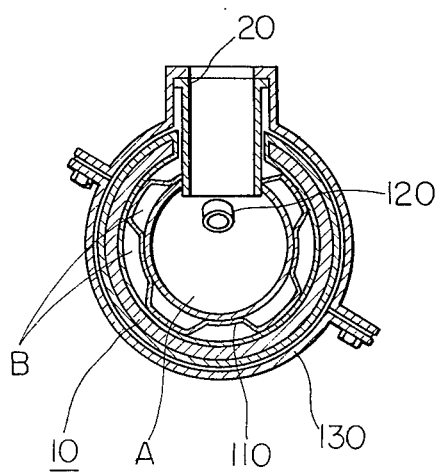
FIGS. 14 and 15 are cross-sectional views taken along the lines XIV—XIV and XV—XV in FIG. 13, respectively.
Figure 15:
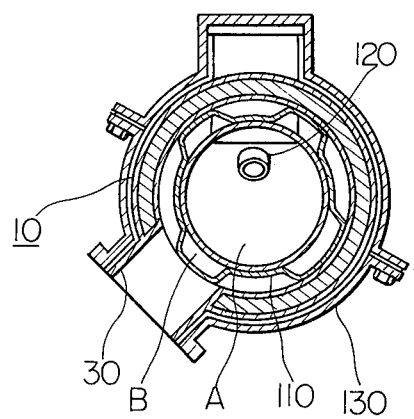

FIGS. 13, 14 and 15 show an inventive reactor of a second type which is in an improvement of the inventive reactor of the first type. Referring to the drawings, the reactor of the second type is a relatively simple structure designed as an apparatus for purifying the exhaust gases from a four cylinder engine. An inner chamber 1 defining a reaction zone is formed with an outer shell 10 which comprises an inner shell wall 11, an outer shell wall 12 and a heat insulated layer 13 sandwiched therebetween as in the first embodiment of the reactor of the first type. Within the inner chamber 1, an inner core 100 of cylindrical form with openings 101 at its opposite ends is axially aligned with the inner shell wall 11 by means of spaced supporting members 110 having a generally wave shaped configuration which are mounted to the inner shell wall 11. Four inlet conduits 20 for introducing either exhaust gases only or exhaust gases and added air are provided in an arrangement such that they are inserted into the outer shell 10 and the inner core 100 to introduce the gases directly into the inner core 100. Further an air nozzle 120 for feeding additional air, which will be referred to as "third air" in relation to the "first air" fed to the engine, is so provided that the third air is injected into one of the core openings 101. Alternatively, two air nozzles may be provided to feed the third air into opposite core openings 101.

An outlet conduit 30 for discharging the purified gases out of the reactor is provided at the central portion of the outer shell 10 and opens into the inner chamber 1 at the inner shell wall. Numeral 130 denotes a housing or casing of the type comprising two halves wherein the above mentioned arrangement is received.

In the above arrangement, the reaction zone in the inner chamber 1 is divided by the inner core 100 into a zone A inside the inner core and a zone B outside the inner core. The zone A communicates with the inlet conduit 20, so that it is referred to as an upper stream zone. The zone B communicates with the outlet conduit 30 and also with the zone A through the opposite openings 101 of the inner core, so that it is referred to as a lower stream zone. In other words, the upper stream zone A is defined by the inner surface of the core 100, while the lower stream zone is defined by the outer surface of the core 100 and the inner shell wall 11. Although the supporting members 110 exist in the lower stream zone B, they do not, because of their wave shaped configuration, obstruct the free passage of gases through the lower stream zone. The introduced gases from the inlet conduits 20 flow firstly into the upper stream zone A and then out to the lower stream zone B surrounding the upper stream zone A, and finally flow out of the inner chamber or the reaction zone through the outlet conduit 30. In this flowing process, if the exhaust gas mixture entering through the inlet conduits 20 and the third air entering through the nozzle 120 are introduced simultaneously, the exhaust gases flowing out of the upper stream zone A are admixed with the injected third air immediately after the exhaust gases flow out of the core openings 101, so that a mixture of the exhaust gases and the third air added from the nozzle flows into the lower stream zone B. According to the invention, the inner core 100 in the above mentioned reactor is coated on its inner and outer surfaces with a catalytic alloy having a reducing activity for the $NO_x$ contents in the exhaust gases and an oxidizing activity for the CO and HC contents in the exhaust gases or alternatively the core itself is made of such catalytic alloy, as in the second embodiment of the reactor of the first type. Further, it is preferable that the other components exposed to the gases, for example the inner shell wall 11, the inlet conduits 20, the outlet conduit 30, the air nozzle 120 and the supporting members 110 are coated at their gas exposed surfaces with the catalytic alloy or are made of the catalytic alloy, as in the reactor of the first type.

Figure 16:
FIG. 16 is an oblique view showing a modification of the inner core mounted in the reactor shown in FIG. 13.

FIG. 16 shows a more preferable modification of the inner core 100. The modified core has on its inner surface spaced receptive plates 102, for gases, which have a curved shape and extend towards the axis of the core. The receptive plates 102 are coated with or made of the catalytic alloy as is the core itself. The catalytic receptive plates 102 result in an increase in the catalytic surface exposed to contact of the exhaust gases.

Figure 17:
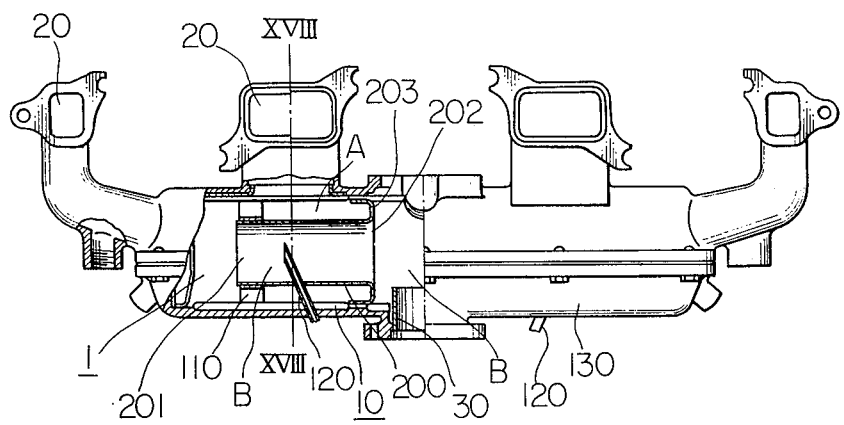
FIG. 17 is a partially sectional side elevation view showing another embodiment of the reactor of the second type according to the invention.
Figure 18:
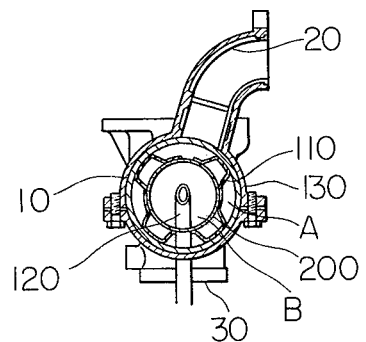
FIG. 18 is a cross-sectional view taken along the line XVIII—XVIII in FIG. 17.

FIGS. 17 and 18 show another embodiment of the inventive reactor of the second type for purifying the exhaust gases from a six cylinder engine. In comparison with the reactor of the first embodiment of the second type, the reactor of the second embodiment of the second type is characterized in that the upper stream zone surrounds the lower stream zone.

Referring to FIGS. 17 and 18, the same numerals as in FIGS. 13, 14 and 15 denote substantially similar components of the reactor. There are fundamental differences in arrangement between the reactors of the first and second embodiments of the second type. That is, a pair of cylindrical inner cores 200, each having two openings 201 and 202, one at each opposite end thereof, are adopted in the reactor of the second embodiment of the second type. Each core has a circumferential flange 203 extending in the direction away from the central axis of the core at the opening and then turning towards the other opening 201. The pair of cores 200 are mounted within the inner chamber 1 in an arrangement such that the opening of the outlet conduit 30, positioned at the center of the inner shell wall 11, is located between the circumferential flanges of the opposite cores. The circumferential flanges 203 are fitted and fixed to the inner shell wall 11, so that one end of each core is supported by the wall. The other end of each core is held by the supporting member 110 mounted to the core as in the reactor of first embodiment of the second type. The inlet conduits 20 for the exhaust gases open to the inner chamber at the inner shell wall without entering the inner cores 200. However, two air nozzles 100 are inserted into the inner cores 200 so as to inject the third air into the gases flowing in to the core opening, respectively.

The above arrangement of the reactor provides a pair of symmetrical upper stream zones A separated by the core walls and the circumferential flanges 203 and a lower stream zone B consisting of the central space between the circumferential flanges of the two cores and the opposite symmetrical core spaces. Each upper stream zone A communicates with two inlet conduits 20 on the right or the left and also communicates with the lower stream zone B through the core opening 201. The lower stream zone B communicates with the outlet conduit 30 through the central space defined by the circumferential flanges 203 of the two cores and the inner shell wall. The exhaust gases are introduced into each upper stream zone A and then flow via each core opening into the lower stream zone B where the gas stream from the two core openings are combined and the combined stream then passes out of the system through the outlet conduit 30. In this process, if air is injected through the nozzle 120, the exhaust gases are admixed with the added air immediately after entering the zone B.

Comparing the reactor of the first embodiment of the second type with the reactor of the second embodiment of the second type, the former has the lower stream zone surrounding the upper stream zone in the inner chamber, while the latter has the upper stream zones surrounding the lower stream zone. However, a common feature in the two reactors is that the exhaust gases receive the injected air immediately after coming from the upper stream zone (or zones) into the lower stream zone. A further common arrangement is that the reactor zone in the inner chamber is separated by the inner core into an upper stream zone and a lower stream zone, and either the inner surface or outer surface of the inner core faces the upper stream zone, while the other surface faces the lower stream zone.

In the reactor of the second embodiment of the second type, at least the core surfaces exposed to the gases are coated with or made of the catalytic alloy as in the reactor of the first embodiment of the second type. With respect to the inner shell wall and the other components exposed to the gases, it is preferable that they also are coated with or made of the catalytic alloy.

The purifying function for the exhaust gases in the above mentioned reactors of the second type will now be explained in detail.

The inlet conduits 20 of the reactor are respectively connected in use with the exhaust ports of the engine and with the inlet conduits for introducing air into the reactor which air is referred to as a secondary air in relation to the first air introduced in the engine. Therefore, the exhaust gases, containing CO, HC and $NO_x$, discharged from the engine flow into the inner chamber 1 of the reactor together with the adjusted air feed as a gas mixture through the inlet conduits 20. So far as this gas feed is concerned, it is roughly speaking the same as in the conventional thermal reactor. However, strictly speaking, it is different from that of the conventional thermal reactor.

According to the invention, the predetermined rich reducing gas mixture is prepared by admixing the exhaust gases from the engine with the secondary air, and then the said reducing gas mixture is introduced into the upper zone A of the reactor, where oxidation of the CO and HC contents and reduction of the $NO_x$ contents can occur as described hereafter. The resultant gases from the upper stream zone then flow into the lower stream zone B, where additional air (third air) in adjusted flow rate is injected into the resultant gases, so that the gas fluid in the lower stream zone B is changed to the desired rich oxidizing gas mixture. Therefore, oxidation of the CO and HC contents of the gas mixture can occur primarily in the lower steam zone B as described hereafter.

According to the invention, the rich reducing gas mixture is provided in the upper stream zone A, so that the upper stream zone A becomes effective for the carrying out of catalytic reduction by the catalytic alloy at the core surfaces exposed to the gas mixture. Generally, such catalysis depends on the temperature of the catalyst. In the inventive reactor, the catalytic alloy at the exposed surfaces is maintained at a high temperature, because the core is heated at the opposite surface by oxidation of the CO and HC contents in the lower stream zone B. Therefore, the upper stream zone A is forced into a condition such that the catalyst temperature is very effective for carrying out catalytic reduction of the reactive gas mixture, so that catalysis of the $NO_x$ contents of the exhaust gas mixture is carried out with high efficiency.

It should be noted that thermal oxidation and catalytic oxidation of the CO and HC contents of the exhaust gas mixture also proceeds to some extent in the upper stream zone A, although not to the same extent as the catalytic reduction. However, since the lower stream zone B is under the condition of a rich oxidizing gas mixture, more effective thermal oxidation and catalytic oxidation, at the catalytic surface of the core, of the CO and HC contents occurs here than in the upper stream zone A, and thus the reduction of the CO and HC contents is attained primarily here. As a result, the heat generated by oxidation in the lower stream zone B contributes to maintain the catalyst at a temperature high enough to effect the catalytic reduction in the upper stream zone A.

Figure 19:
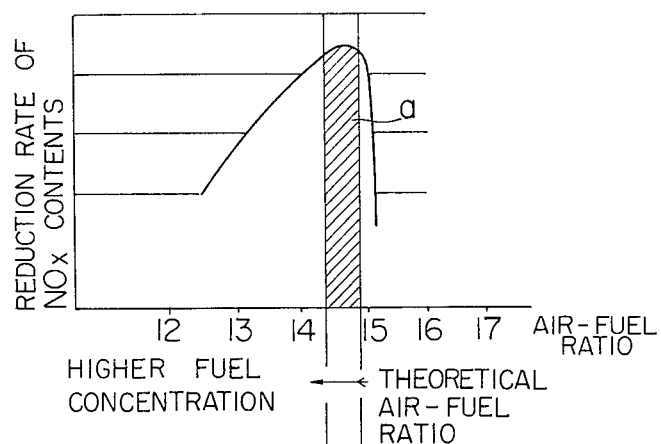
FIGS. 19 and 20 are graphs of the reduction rate of $NO_x$ contents vs. air-fuel ratio and the reduction rate of CO and HC contents vs. air-fuel ratio, respectively, wherein optimum conditions of reacting gas mixtures applied in the inventive reactor of the second type are illustrated.
Figure 20:
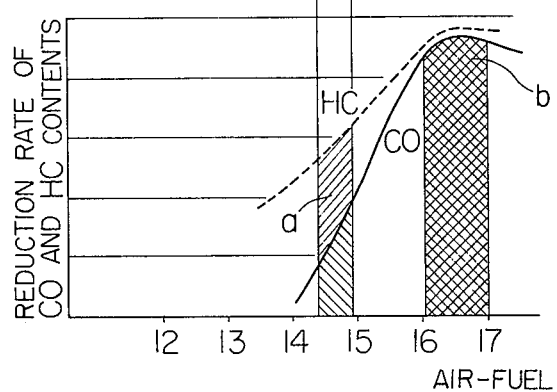

FIGS. 19 and 20 are graphs indicating theoretical curves showing tendencies of reduction rates of the $NO_x$ contents and the CO and HC contents under various conditions of the reactant gas mixture represented by the air-fuel ratio. In FIG. 20, the solid line shows characteristics of the CO and HC contents, while the dotted line shows characteristics of the $NO_x$ contents.

The inventive reactor of the second type is applicable under optimum conditions described as follows and defined by the shaded portions a and b of FIGS. 19 and 20. According to the inventive reactor, the exhaust gas mixture introduced into the upper stream zone A can be adjusted so that it corresponds to exhaust gases which would result from starting gases in the engine having the theoretical air-fuel ratio or an air-fuel ratio higher in fuel concentration than the theoretical ratio. That is, although the optimum condition varies, strictly speaking, according to the contents of the gasoline used in the engine, the air-fuel ratio should be 14 to 15. Similarly, the exhaust gas mixture introduced into the lower stream zone B can be prepared so that it corresponds to exhaust gases which would result from starting gases in the engine having an air-fuel ratio of from 16 to 17.

The desired exhaust gas mixture introduced into the upper stream zone A can be attained by controlling the air feed from the engine carburetor and/or from the secondary air supply connected to the inlet conduits 20. The desired exhaust gas mixture introduced into the lower stream zone B can be attained by controlling the third air feed from the injection nozzle 120. By adjusting the respective exhaust gas mixtures as above, it is apparent from FIGS. 19 and 20 that a rich reducing gas mixture, for maximum reduction of the $NO_x$ contents in the exhaust gases introduced, is provided in the upper stream zone A and a rich oxidizing gas mixture, for maximum reduction of the CO and HC contents in the exhaust gases, is provided in the lower stream zone B.

As can also be understood from FIGS. 9 and 20, a reduction of the CO and HC contents by oxidation is effected to some extent in the presence of the rich reducing gas mixture in the upper stream zone A, although the reduction rate is not as high as in the presence of the rich oxidizing gas mixture in the lower stream zone B. Contrary to this, it is not expected that a substantial reduction of the $NO_x$ contents can be effected in the presence of the rich oxidizing gas mixture in the lower stream zone B.

According to the inventive reactor of the second type, the rich reducing gas mixture and the rich oxidizing gas mixture can be provided in the upper stream zone A and in the lower stream zone B respectively, while the inner core defining the boundaries of the two zones provides surfaces facing the respective zones, which surfaces each have the capability of inducing catalytic activities for oxidation and reduction. Therefore, the inventive reactor of the second type has the possibility of effecting maximum reduction of the CO, HC and $NO_x$ contents in the exhaust gases from the engine by adjustment of the reactant gas mixture.

Figure 21:
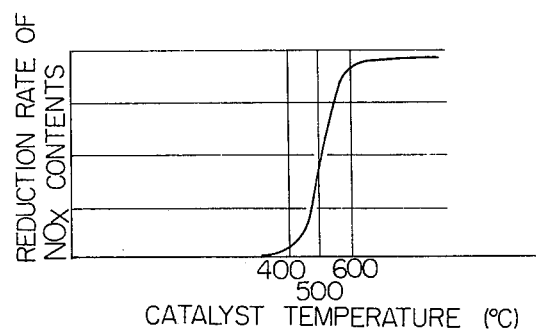
FIG. 21 is a graph of the reduction rate of $NO_x$ contents vs. catalyst temperature showing characteristics of the catalytic activity for reduction at various temperatures.

From FIG. 21, which is a graph showing the relation of the $NO_x$ contents reduction rate to the catalyst temperature, it is apparent that achievement of high reduction rate for the $NO_x$ contents requires that the catalyst be maintained at a temperature higher than 500° C. According to the inventive reactor of the second type, a high temperature such as 500° C of the catalyst is attained by the arrangement wherein a great amount of heat generated by oxidation of the CO and HC contents is applied to heat at least the catalytic core. In other words, according to the invention, the oxidation of a relatively great amount of CO and HC contents is promoted within the zone facing one of the core surfaces and thus, the other core surface is maintained at a temperature high enough to effect the catalytic reduction within the other zone facing said other core surface.

Further, in the inventive reactor of the second type, the inner chamber is not filled with catalyst particles or catalyst carriers, so that the upper and lower stream zones in the inner chamber are not limited in size and thus there are no obstacles within the spaces. Therefore, the contacting time of the gases in the inner chamber can be maintained substantially as long as in the conventional thermal reactor. In other words, the inventive reactor provides a contacting time long enough to effect the thermal oxidation of the CO and HC contents at least as well as the conventional thermal reactor.

Therefore, since environments which are adequate for effecting thermal and catalytic oxidation of the CO and HC contents and also for effecting catalytic reduction of the $NO_x$ contents can be presented in the inventive reactor, high reduction rates for the CO, HC and $NO_x$ contents in the exhaust gases are attained. Further, if, in addition to the catalytic core, the other components of the reactor exposed to the gases are coated with or made of the catalytic alloy, the catalytic surface area can be enlarged without decreasing the contacting time of the gases in the reactor, so that even greater reduction rates for the CO, HC and $NO_x$ contents can be attained.

It must be understood that the reactors described above are merely embodiments of this invention and that variations may be made to the reactor within the spirit and scope of the invention. It will be apparent, for example, that various components may be adapted to the reactor to increase the catalytic surface and/or to enable the reactant gases to effectively contact the catalytic surface and still be within the scope of the invention. With respect to the possible inner core, it is not limited to the cylindrical core as exemplified above. For example, the upper stream zone and the lower stream zone in the reactor may be defined by a separator such as a flat or curved plate.

What we claim is:

1. An apparatus for purifying exhaust gases from an internal combustion engine containing CO, unburned HC, and $NO_x$ components of the type having an outer shell of heat insulated construction enclosing an inner chamber, at least one inlet conduit adapted for connection to the exhaust ports of the engine for introducing exhaust gases to the inner chamber, and an outlet conduit for discharging the resulting purified gases from the chamber, a heat conductive baffle positioned within the inner chamber for dividing the inner chamber into an upstream reduction zone having at least one surface composed of a catalytic material for promoting reduction of the $NO_x$ components in the exhaust gases and communicating with the inlet conduit, and a substantially unobstructed downstream thermal, flame-type oxidation zone having an inlet region communicating with the upstream zone and an outlet region communicating with the outlet conduit, and an injection conduit extending through the outer shell and having an outer end adapted for connection to a source of air and an inner end positioned to inject air from said source into the exhaust gases passing from the upstream zone into the downstream zone in sufficient quantity to create an oxygen-rich mixture in the downstream zone, wherein the improvement comprises:

the surfaces of the heat conducting baffle that are exposed to the exhaust gases in the upstream and downstream zones being composed of material having dual reducing and oxidizing cataltyic activities for reducing the $NO_x$ components of the exhaust gases in the upstream zone and for augmenting the thermal, flame-type oxidation of CO and HC components of the exhaust gases in the interior of the downstream zone by catalytic no-flame oxidation adjacent to the baffle surface, thereby increasing the amount of CO and HC components that are oxidized in the downstream zone and thus increasing the heat generated by the oxidizing reactions in the downstream zone, this additional heat being transferred through the baffle to increase the catalytic reducing reaction in the upstream zone and to shorten the warmup time.

2. The apparatus of claim 1 wherein the inner surface of the outer shell that forms the inner chamber is composed of said catalytic material having both reducing and oxidizing activities.

3. The apparatus of claim 1 wherein the separating baffle is in the form of a cylindrical core, and the inlet conduit opens into the interior of the core so that the upstream zone is inside the cylindrical core, and the downstream zone is between the exterior of the cylindrical core and the inner surface of the outer shell.

4. The apparatus of claim 1 wherein the separating baffle is in the form of a cylindrical core, and the outlet conduit extends from the interior of the core so that the downstream zone is inside the cylindrical core, and the upstream zone is between the exterior of the cylindrical core and the inner surface of the outer shell.

5. A method of purifying exhaust gases containing CO, unburned HC, and $NO_x$ components of the type that includes the successive steps of feeding a rich reducing mixture of hot exhaust gases into an upstream zone in a heat insulated chamber, the upstream zone including exposed surfaces composed of an alloy with reducing catalytic properties, the temperature in the upstream zone being high enough to cause catalytic reduction of the $NO_x$ components in the exhaust gases; passing the resultant gases from the upstream zone to a substantially unobstructed downstream zone in the chamber on the other side of a heat conductive wall separating the upstream and downstream zones; and adding air to the resultant gases as they enter the downstream zone in an amount sufficient to form a rich oxidizing gas mixture to cause thermal flame-type oxidation of the CO and unburned HC components in the downstream zone, wherein the improvement comprises:

providing the heat conductive wall with surfaces composed of a catalytic material having dual reducing and oxidizing properties so that the thermal oxidation of CO and HC in the downstream zone will be augmented by catalytic oxidation adjacent to said wall in the downstream zone, thereby increasing the amounts of CO and HC that are oxidized and, because the additional heat of the catalytic oxidation reaction being transmitted through the heat conductive wall to the upstream zone increases the temperature of the reduction zone catalyst, increasing also the amount of $NO_x$ reduced in the upstream zone.

6. The method of claim 5 wherein the exhaust gases are from an internal combustion engine; said rich reducing gas mixture corresponds to the exhaust gases which would result from an intake air-fuuel air-fuel to the engine of from 14 to 15; and said rich oxidizing mixture corresponds to the exhaust gases which would result from an intake air-fuel ratio to the engine of 16 to 17.

7. The method of claim 5 wherein the heat transferred through the heat conductive wall by the thermal and catalytic oxidation reactions in the downstream zone is sufficient to maintain the catalytic surface of the wall exposed to the upstream zone at a temperature of more than 500° C.

* * * * *

UNITED STATES PATENT AND TRADEMARK OFFICE
CERTIFICATE OF CORRECTION

PATENT NO. : 3,947,545
DATED : March 30, 1976
INVENTOR(S) : Yasuhiko Ishida, et al It is certified that error appears in the above-identified patent and that said Letters Patent are hereby corrected as shown below:

Column 2, line 4 - delete "reaction" (first occurrence) and add --the--

Column 2, line 5 - correct spelling of "reaction"

Column 3, line 13 - insert "," after "that"

Column 4, line 9 - insert "," between "Generally" and "the"

Column 4, line 29 - change "for" to --of--

Column 16, line 25 - change "air-fuuel" to --air fuel--;

" " " " delete "air-fuel" (second occurrence) and add --ratio--

Signed and Sealed this twenty-ninth Day of June 1976

[SEAL]

Attest:

RUTH C. MASON
Attesting Officer

C. MARSHALL DANN
Commissioner of Patents and Trademarks